US012603454B2

(12) United States Patent
Hashiguchi et al.

(10) Patent No.: US 12,603,454 B2
(45) Date of Patent: Apr. 14, 2026

(54) CONNECTOR AND WIRE HARNESS

(71) Applicant: JAPAN AVIATION ELECTRONICS INDUSTRY, LIMITED, Tokyo (JP)

(72) Inventors: Tsubasa Hashiguchi, Tokyo (JP); Kazuki Kugo, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 276 days.

(21) Appl. No.: 18/206,298

(22) Filed: Jun. 6, 2023

(65) Prior Publication Data

US 2023/0402783 A1 Dec. 14, 2023

(30) Foreign Application Priority Data

Jun. 14, 2022 (JP) ................................. 2022-095876

(51) Int. Cl.
| | |
|---|---|
| *H01R 13/436* | (2006.01) |
| *B60R 16/02* | (2006.01) |
| *H01R 13/52* | (2006.01) |

(52) U.S. Cl.
CPC ....... *H01R 13/436* (2013.01); *B60R 16/0215* (2013.01); *H01R 13/5221* (2013.01); *H01R 2201/26* (2013.01)

(58) Field of Classification Search
CPC .............. H01R 13/426; H01R 13/4367; H01R 13/5205; H01R 13/521; H01R 13/40;
(Continued)

(56) References Cited

U.S. PATENT DOCUMENTS

| | | | | |
|---|---|---|---|---|
| 4,544,220 A | 10/1985 | Aiello et al. | | |
| 5,516,310 A | * 5/1996 | Sawada | ................ | H01R 13/187 |
| | | | | 439/843 |

(Continued)

FOREIGN PATENT DOCUMENTS

| | | |
|---|---|---|
| CN | 208797233 | 4/2019 |
| JP | 60-158575 | 8/1985 |

(Continued)

OTHER PUBLICATIONS

Notification of Grounds for Refusal issued in Republic of Korea Patent Application No. 10-2023-0070838, dated Jan. 14, 2025, together with an English translation.

(Continued)

*Primary Examiner* — Tulsidas C Patel
*Assistant Examiner* — Carlos E Lopez-Pagan
(74) *Attorney, Agent, or Firm* — GREENBLUM & BERNSTEIN, P.L.C.

(57) ABSTRACT

A connector includes: a contact in which an annular groove is formed on a middle portion; a sleeve that includes a cylindrical portion that allows the contact to be inserted therethrough, tongue pieces that are extended from the cylindrical portion, and are arranged in a circumferential direction of the cylindrical portion, and a claw portion that is protruded inward in a radial direction on each front end of the tongue pieces; a housing in which a step surface facing rearward is formed on an inner wall facing an accommodation space; and a holder that has a C-shaped cross section. The sleeve is attached to the contact in a manner such that the claw portion is fitted into the annular groove. The contact and the sleeve are accommodated in the accommodation space with the tongue pieces abutted on the step surface and are retained in the accommodation space by the holder.

1 Claim, 7 Drawing Sheets

<u>300</u>

(58) Field of Classification Search
CPC .............. H01R 13/5221; H01R 13/436; H01R
2201/26; H01R 13/52; H01R 13/111;
H01R 13/506; H01R 13/5202; H01R
13/5804; H01R 13/627; B60R 16/0215
USPC ...................................................... 439/733.1
See application file for complete search history.

(56)                  References Cited

U.S. PATENT DOCUMENTS

| | | | | |
|---|---|---|---|---|
| 8,123,535 | B1 * | 2/2012 | Yeon .................... | H01R 13/502 |
| | | | | 439/101 |
| 10,355,391 | B2 | 7/2019 | Uenosono et al. | |
| 2011/0059659 | A1 | 3/2011 | Matsumoto et al. | |
| 2019/0291588 | A1 * | 9/2019 | Chou ................. | H01R 13/5202 |
| 2019/0334293 | A1 * | 10/2019 | Iwami .................... | B60L 53/16 |
| 2021/0281003 | A1 * | 9/2021 | Zucca .................... | H01R 13/42 |

FOREIGN PATENT DOCUMENTS

| | | | |
|---|---|---|---|
| JP | H06-054250 | U | 7/1994 |
| JP | H06-325811 | A | 11/1994 |
| JP | 5044508 | B2 | 10/2012 |
| JP | 2018-10787 | | 1/2018 |

OTHER PUBLICATIONS

Official Communication Received in Japanese Patent Application No. 2022-095876, dated Feb. 17, 2026, with English translation thereof.

\* cited by examiner

CONNECTOR AND WIRE HARNESS

TECHNICAL FIELD

The present invention relates to a connector used for a wire harness and a wire harness that is used in automobiles and the like.

BACKGROUND ART

FIG. 1 is a sectional view of a connector that is described in Japanese Registered Patent No. 5044508 (hereinafter, referred to as Patent Literature 1) as a related art of this kind of connector. FIG. 2 is an exploded perspective view of the connector illustrated in FIG. 1.

A connector 10 includes a metal terminal 11, a connector housing 12, a rear holder 13, a rear packing 14, a sleeve member 15, and a center packing 16.

The metal terminal 11 includes a wire connection portion 11a and an electrical contact portion 11b, and a flange portion 11c is provided to the wire connection portion 11a. A concave groove 11d is formed on an outer peripheral surface of the flange portion 11c. A core wire 17a of a wire 17 is inserted into the wire connection portion 11a and the core wire 17a is attached by crimping the wire connection portion 11a. The electrical contact portion 11b is connected with a metal terminal of a mating connector when the metal terminal of the mating connector is inserted therein and it is elastically deformed thereby.

A terminal accommodation chamber 18 is formed in the connector housing 12. The terminal accommodation chamber 18 includes a connection portion accommodation portion 18a and a contact portion accommodation portion 18b that have round cross-sectional shapes, and a step surface 18c that is formed between the connection portion accommodation portion 18a and the contact portion accommodation portion 18b. The contact portion accommodation portion 18b is formed so that an internal diameter thereof is smaller than an internal diameter of the connection portion accommodation portion 18a. The connection portion accommodation portion 18a accommodates the wire connection portion 11a of the metal terminal 11 and the contact portion accommodation portion 18b accommodates the electrical contact portion 11b of the metal terminal 11. The step surface 18c faces the flange portion 11c of the metal terminal 11, thus being able to come into contact with the flange portion 11c.

The rear holder 13 is formed to have a cylindrical shape and is attached to an end portion of the connector housing 12. A through hole 13a for introducing the wire 17 is formed in the rear holder 13.

The rear packing 14 is inserted into the connection portion accommodation portion 18a of the terminal accommodation chamber 18 in a state in which the wire 17 passes through the rear packing 14. The rear packing 14 maintains water-tightness between the outer peripheral surface of the wire 17 and the inner surface of the connection portion accommodation portion 18a.

The sleeve member 15 has a C-shaped cylindrical cross section. The sleeve member 15 is arranged between the flange portion 11c and the rear packing 14 in a state in which the wire connection portion 11a of the metal terminal 11 is inserted in the sleeve member 15, and the sleeve member 15 is thus accommodated in the connection portion accommodation portion 18a of the terminal accommodation chamber 18. That is, the sleeve member 15 is arranged between the rear holder 13 and the flange portion 11c with the rear packing 14 interposed between the sleeve member 15 and the rear holder 13.

The center packing 16 is accommodated in the concave groove 11d of the flange portion 11c and maintains water-tightness between the outer peripheral surface of the flange portion 11c and the inner surface of the connection portion accommodation portion 18a of the terminal accommodation chamber 18.

The connector 10 described in Patent Literature 1 has the configuration in which the metal terminal 11 has the flange portion 11c, which is abutted on the step surface 18c of the terminal accommodation chamber 18, and the sleeve member 15 is provided between the flange portion 11c and the rear holder 13 so as to prevent the metal terminal 11 from slipping out.

As described above, the connector 10 of the related art is configured in a manner such that when the metal terminal 11 is inserted into the terminal accommodation chamber 18 of the connector housing 12, the flange portion 11c provided to the metal terminal 11 is abutted on the step surface 18c formed in the terminal accommodation chamber 18, block-ing forward movement of the metal terminal 11 to position it thereby.

However, if the flange portion 11c is provided to the metal terminal 11 as described above, the rear holder 13 and the rear packing 14, which have the holes only for the wire 17 to pass through that are smaller than the flange portion 11c in diameter, cannot be mounted from the front end side (i.e., the electrical contact portion 11b side) of the metal terminal 11 passing over the flange portion 11c. Accordingly, the rear holder 13 and the rear packing 14, which are to be located on the rear end side of the metal terminal 11 and attached around the wire 17, need to be attached to the wire 17 in advance before attaching the metal terminal 11 to the wire 17 by crimping the wire connection portion 11a of the metal terminal 11.

That is, in the connector 10 of the related art, fastening work (i.e., crimping work) of the metal terminal 11 to the wire 17 has to be performed in a state in which the rear holder 13 and the rear packing 14 are preliminarily equipped and attached to the wire 17. Especially, a large component such as the rear holder 13 attached to the wire 17 hinders and makes difficult the crimping work, resulting in poor work-ability.

BRIEF SUMMARY OF THE INVENTION

An object of the present invention is to provide a con-nector and a wire harness in which workability in crimping of a contact to a wire is improved compared to related arts.

According to the present invention, the connector com-prises: a contact comprising a contact portion, a middle portion, and a connection portion, the contact portion and the connection portion being formed, respectively, as a front portion and a rear portion of the contact in a front-rear direction, the middle portion being formed between the contact portion and the connection portion, the contact portion being configured to come into contact with a contact of a mating connector, the connection portion being config-ured to be crimped to a core wire of a wire, the middle portion having an outer periphery around the front-rear direction, the outer periphery being formed with an annular groove thereon, the annular groove extending around the front-rear direction along the outer periphery; a sleeve comprising a cylindrical portion, tongue pieces, and claw portions, the cylindrical portion being formed as a cylinder having an axial direction, a radial direction, and a circumferential direction associated therewith, the axial direction being aligned with the front-rear direction, the cylinder having a dimension in the radial direction that allows the contact to be inserted therethrough along the axial direction, the cylindrical portion having one end thereof in the axial direction, each of the tongue pieces extending in the axial direction from the one end of the cylindrical portion and having a front end at an end opposite to the one end of the cylindrical portion, each of the tongue being elastically deformable in the radial direction, the tongue pieces being arranged in the circumferential direction, each of the claw portions being formed on the front end of each of the tongue pieces and protruding inward in the radial direction; a housing being formed with an accommodation space therewithin, the housing having an inner wall facing the accommodation space, the accommodation space piercing through the housing in the front-rear direction, the inner wall comprising a step surface facing rearward in the front-rear direction, a cross section of the accommodation space perpendicular to the front-rear direction changing at the step surface along the front-rear direction such that the cross section is greater in a rear region than in a front region of the front-rear direction in relation to the step surface; and a holder having a C-shape in a cross-section perpendicular to the front-rear direction such that the holder has an opening extending along the front-rear direction, whereby the wire may be put through the opening transversely to the front-rear direction, wherein the sleeve is attached to the contact in a manner such that the claw portions are fitted into the annular groove and the sleeve houses the connection portion therein, and the contact and the sleeve are housed in the accommodation space with the front ends of the tongue pieces abutted on the step surface and are retained in the accommodation space by the holder fastened to the housing from rear side in the front-rear direction.

And according to the present invention, the wire harness comprises: the connector according to the present invention and a wire having a terminal portion thereof, the wire harness further comprising a shrink tube, a rubber plug for sleeve, and a rubber plug for wire, wherein the connection portion and the terminal portion of the wire are covered by the shrink tube, the rubber plug for sleeve seals between the inner wall facing the accommodation space and the cylindrical portion, and the rubber plug for wire seals between the cylindrical portion and the wire.

Effects of the Invention

According to the present invention, the number of components, which are to be preliminarily attached to a wire, in crimping of contact to the wire can be reduced compared to related art, being able to improve workability in contact crimping.

BRIEF DESCRIPTION OF THE DRAWINGS

FIG. 4 is an enlarged sectional view of the connector illustrated in FIG. 3.

4

Figure 1:
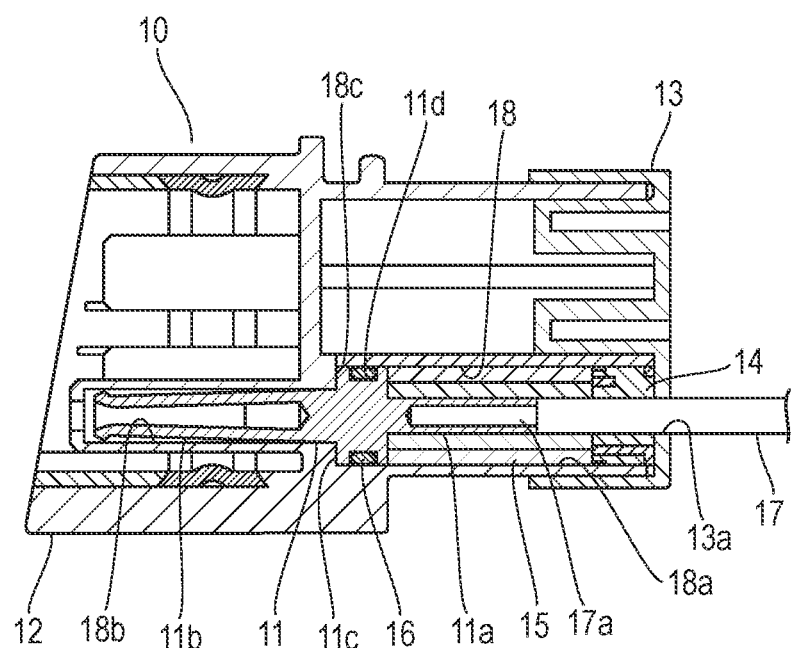
FIG. 1 is a sectional view illustrating a connector of related art.
Figure 2:
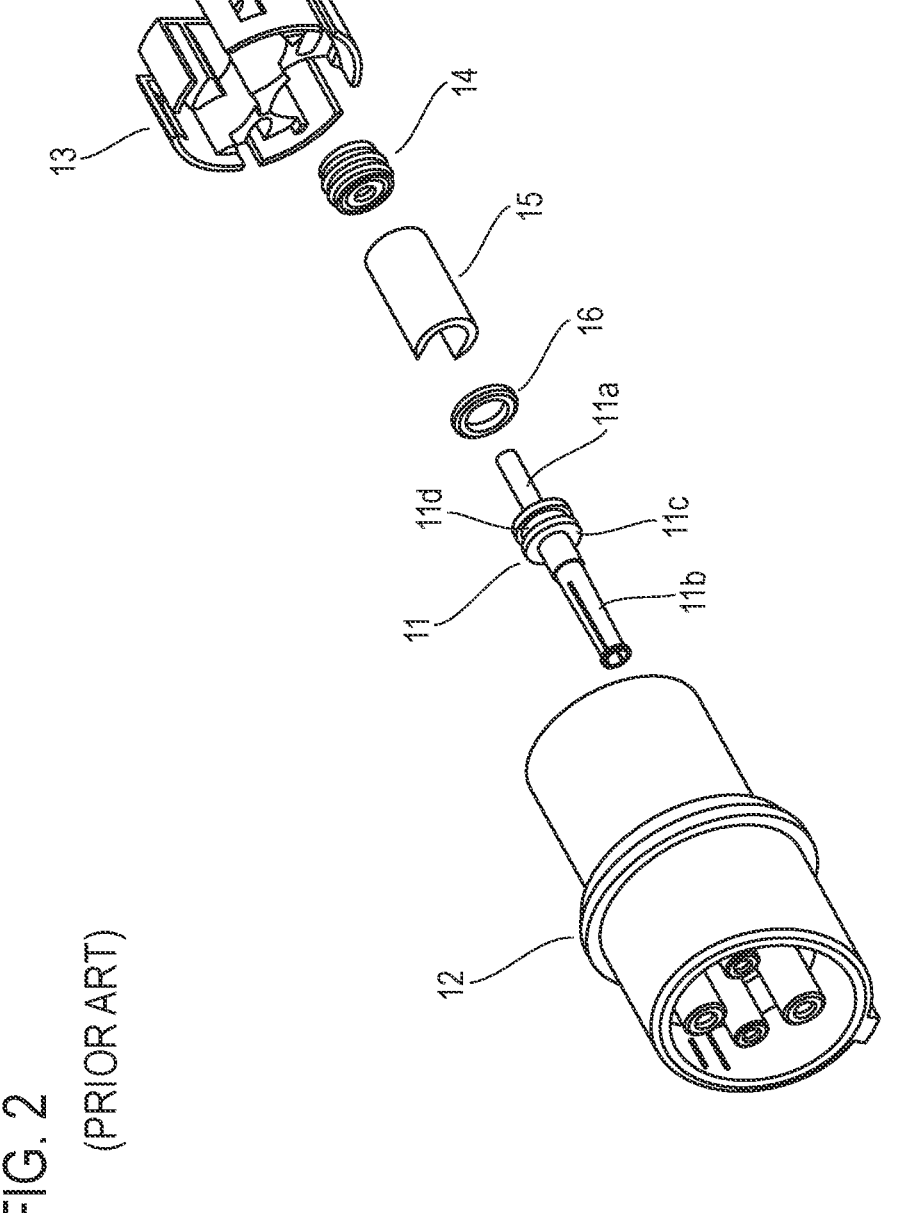
FIG. 2 is an exploded perspective view of the connector illustrated in FIG. 1.
Figure 3:
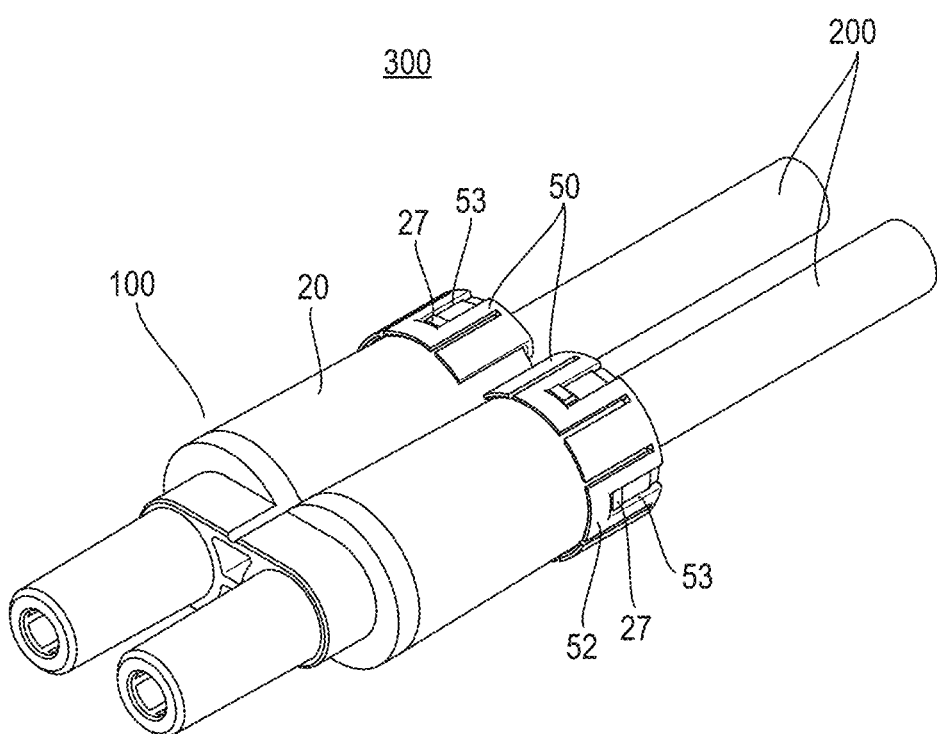
FIG. 3 is a perspective view illustrating an example of a connector according to the present invention.
Figure 6:
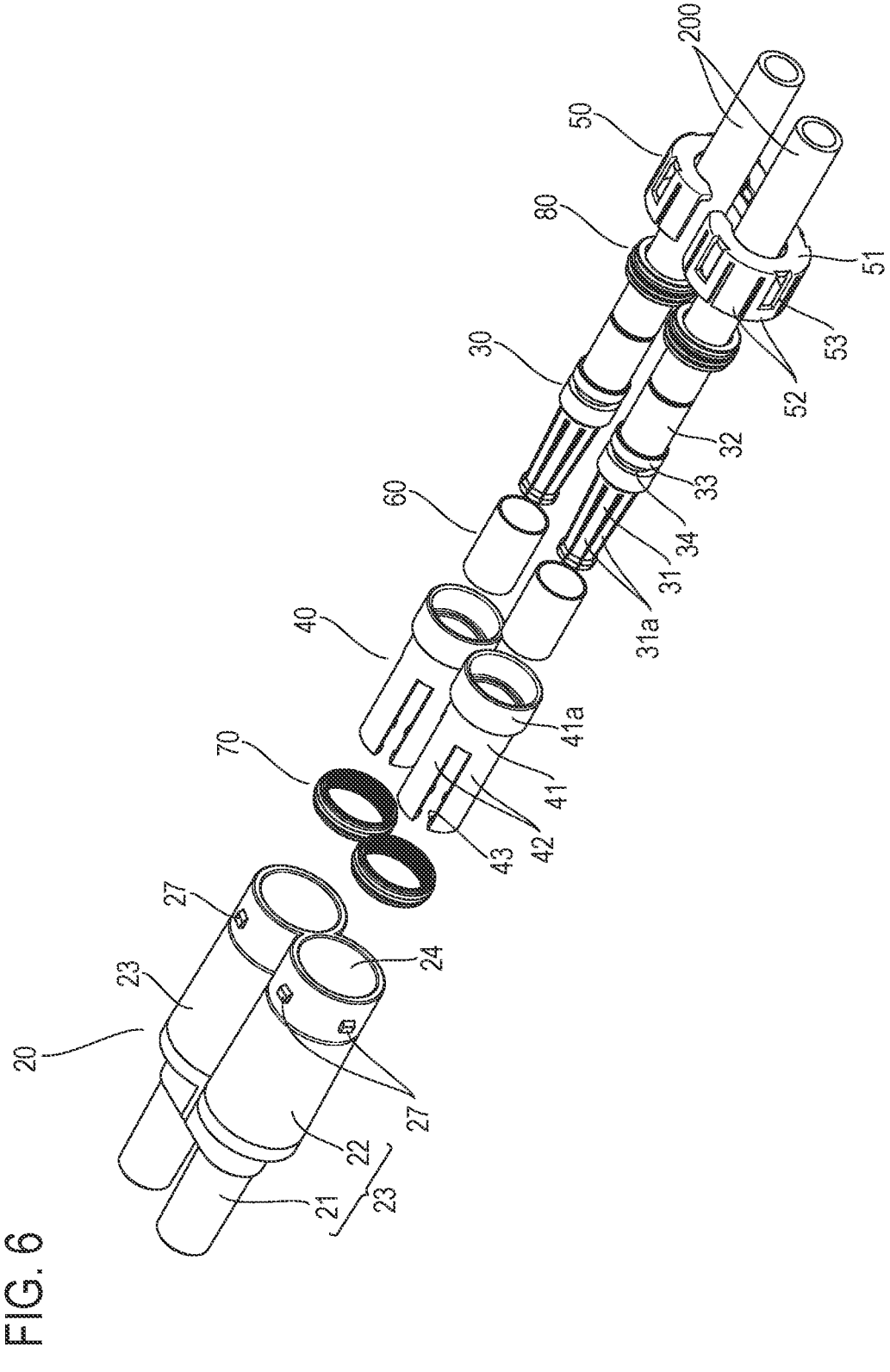

FIG. 6 is an exploded perspective view of the connector illustrated in FIG. 3.

Figure 7A:
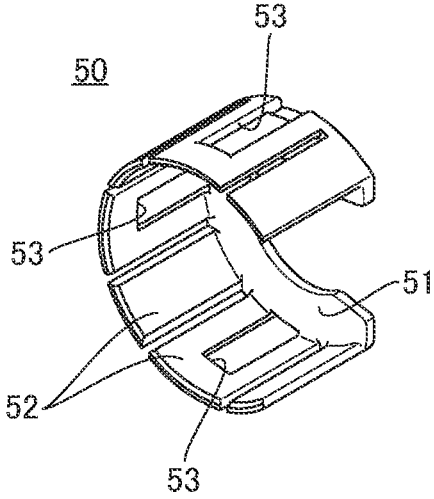

FIG. 7A is a perspective view of a holder in FIG. 3.

Figure 7B:
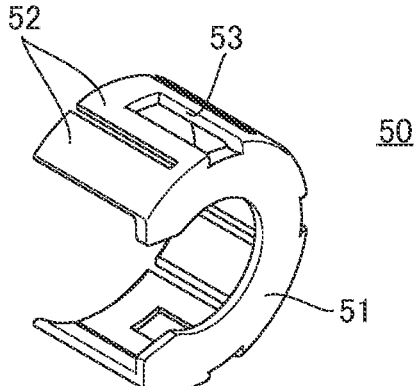

FIG. 7B is a perspective view obtained by viewing FIG. 7A from the opposite side.

LIST OF REFERENCE NUMERALS

10: connector
11: metal terminal
11*a*: wire connection portion
11*b*: electrical contact portion
11*c*: flange portion
11*d*: concave groove
12: connector housing
13: rear holder
13*a*: through hole
14: rear packing
15: sleeve member
16: center packing
17: wire
17*a*: core wire
18: terminal accommodation chamber
18*a*: connection portion accommodation portion
18*b*: contact portion accommodation portion
18*c*: step surface
20: housing
21: small diameter portion
22: large diameter portion
23: accommodation portion
24: accommodation space (inner space)
25: step surface (stopper)
26: second step surface
27: protrusion
30: contact
31: contact portion
31*a*: contact piece
32: connection portion
33: middle portion
34: annular groove
40: sleeve
41: cylindrical portion (cylindrical base)
41*a*: large diameter portion
42: tongue piece (side wall)
43: claw portion (claw)
50: holder (C-shaped holder)
51: lid portion
52: extension piece
53: window
60: shrink tube
70: rubber plug for sleeve (first gasket)
80: rubber plug for wire (second gasket)
100: connector
200: wire
200*a*: terminal portion
210: coating
220: core wire (core conductor)
300: wire harness

DETAILED DESCRIPTION

An embodiment of the present invention will be described based on examples with reference to the accompanying drawings.

Figure 4:
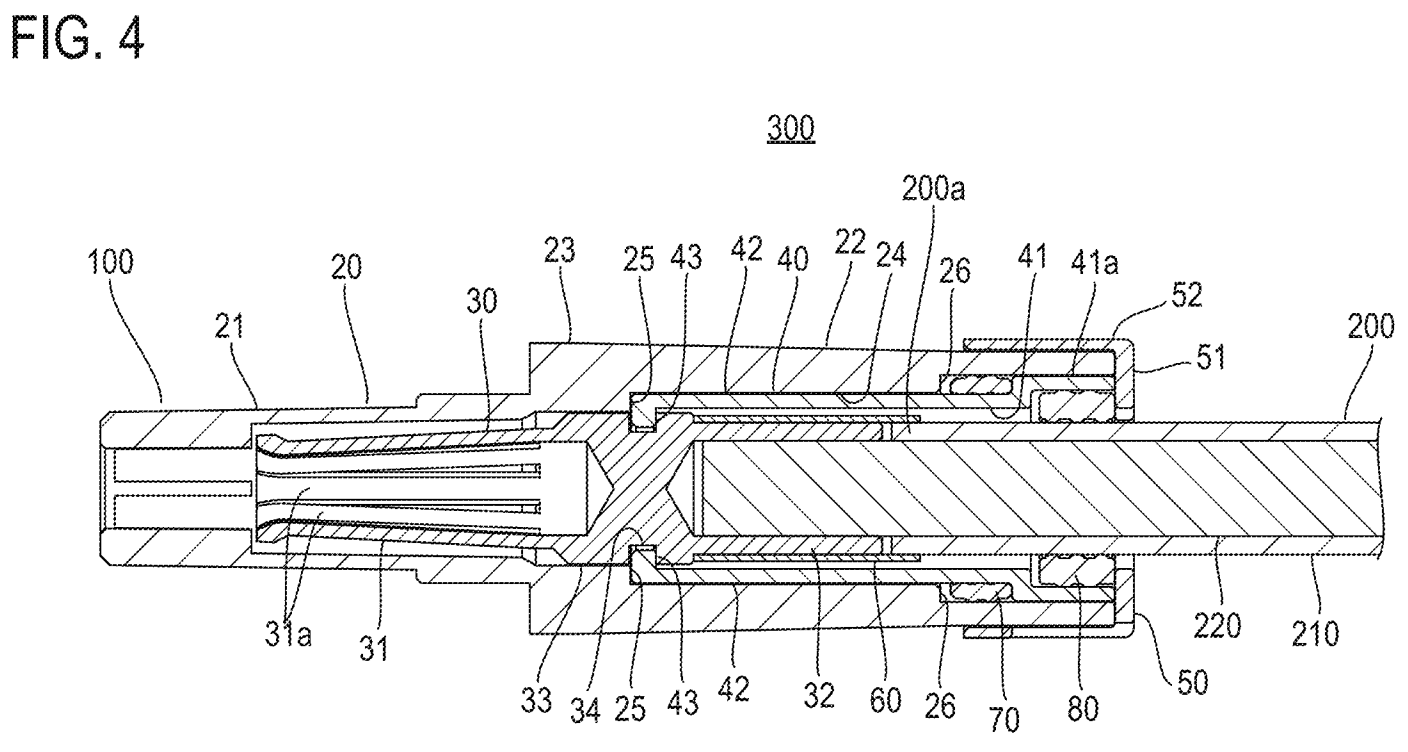
Figure 5:
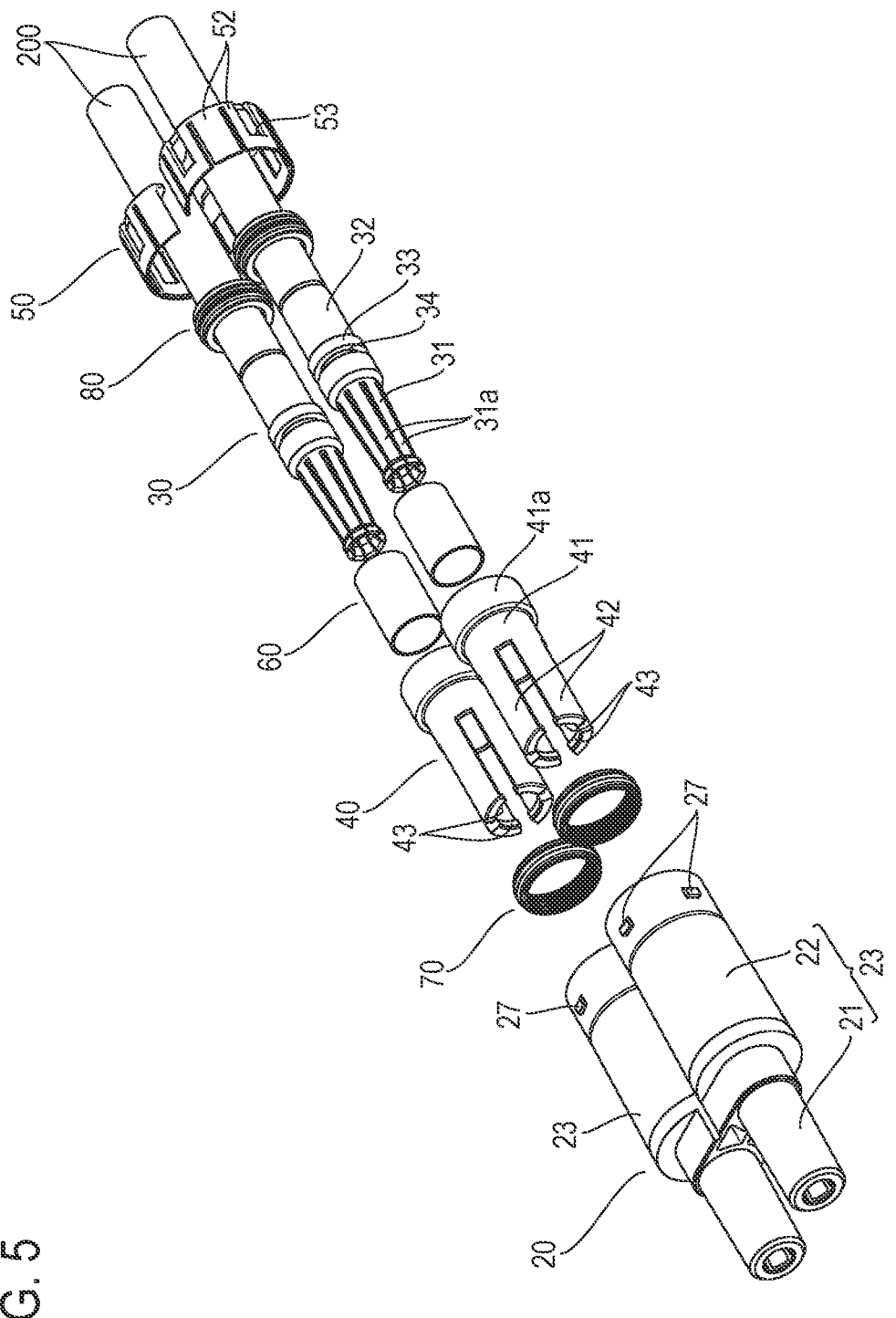
FIG. 5 is an exploded perspective view of the connector illustrated in FIG. 3.

FIG. 3 illustrates an outer appearance of an example of a connector and a wire harness 300 including the connector according to the present invention, and FIG. 4 illustrates a cross-sectional structure of the connector and the wire harness 300. FIGS. 5 and 6 illustrate a connector 100 of FIG. 3 in exploded form. In this example, the connector 100 is a two-core connector which is attached to terminals of two wires. FIGS. 3 to 6 illustrate a connector 100 and a wire 200 which constitute a wire harness 300.

The connector 100 in this example is configured to include a housing 20, two contacts 30, two sleeves 40, two holders 50, two shrink tubes 60, two rubber plugs for sleeve 70, and two rubber plugs for wire 80. FIGS. 5 and 6 illustrate a state in which the contacts 30 are attached to the wires 200. Configurations of respective chief components will be first described.

In the contact 30, one end portion (front portion) is a contact portion 31 that may come into contact with a contact of a mating connector and the other end portion (rear portion) is a connection portion 32 that may be crimped to a terminal of the wire 200. Further, an annular groove 34 is formed along an outer periphery of a middle portion 33, which is between the contact portion 31 and the connection portion 32. The connection portion 32 has a cylindrical shape and the contact portion 31 serves as a socket that may hold a pin contact of a mating connector with a plurality of contact pieces 31a in this example.

The sleeve 40 includes a cylindrical portion 41 having a cylindrical shape and a plurality of (four pieces, in this example) tongue pieces 42 that are formed in a manner to be extended from one end of the cylindrical portion 41 in an axial direction of the cylindrical portion 41. The cylindrical portion 41 has a size, or in other words, a dimension in a radial direction perpendicular to the axial direction (i.e., a transverse area) which allows the contact 30 to be inserted therethrough. That is, the inner diameter of the cylindrical portion 41 is larger than the outer diameter of the thickest portion (the middle portion 33, in this example) of the contact 30. The other end portion of the cylindrical portion 41, which refers to the other end opposite to said one end from which the tongue pieces 42 are extending, has a large inner/outer diameter, forming a large diameter portion 41a.

The four tongue pieces 42 are formed by dividing a cylinder, which is the same as the cylindrical portion 41, into four portions by four slits extending in the axial direction. That is, the four tongue pieces 42 are arranged in a circumferential direction of the cylindrical portion 41 with the slits therebetween. These four tongue pieces 42 are elastically deformable in the radial direction with respect to an axial center of the cylindrical portion 41. On each front end of the four tongue pieces 42, a claw portion 43 is formed in a manner to protrude inward in the radial direction.

The housing 20 has two accommodation portions 23 coupled to each other, in this example. Each of the accommodation portions 23 is composed of a small diameter portion 21 and a large diameter portion 22 that continues from the small diameter portion 21. In the inside of each of the accommodation portions 23, an accommodation space 24 is formed so that the accommodation space 24 penetrates, or pierces, through the small diameter portion 21 and the large diameter portion 22 in a front-rear direction (see FIG. 4). The front-rear direction, here, is aligned with the axial direction of the cylindrical portion 41 of the sleeve 40. In the large diameter portion 22, which is positioned on the rear side of the small diameter portion 21, a step surface 25 facing rearward is formed on an inner wall facing the accommodation space 24 at a position close to the small diameter portion 21. And further, in this example, a second step surface 26 also facing rearward is formed on the inner wall at another position that is closer to a rear-end opening of the accommodation space 24, as illustrated in FIG. 4. The step surface 25 and the second step surface 26 make the cross section of the accommodation space 24 wider (larger) in the rear of them than in the front of them, respectively. Here, three protrusions 27 are formed to be arranged in a circumferential direction on the outer periphery of a rear end portion of each of the large diameter portions 22.

As illustrated in FIGS. 7A and 7B in an enlarged manner, the holder 50 includes a lid portion 51 having a C shape and seven extension pieces 52. The extension pieces 52 are extended from an outer periphery of the lid portion 51 in a direction orthogonal to a plate surface of the lid portion 51, and are arranged in the circumferential direction to form a peripheral wall having a C-shaped cross section as a whole. Of the seven extension pieces 52, on three extension pieces 52 on even-numbered positions from one end of the C shape, windows 53 are formed as illustrated in FIGS. 7A and 7B. Here, the size of the C-shaped opening portion of the holder 50 is larger than the outer diameter of the wire 200.

Attachment of the wire 200 to the connector 100 and assembly of them into the wire harness 300 will be described in order below. Here, two wires 200 are attached to the connector 100 in the same manner and therefore, attachment of one wire 200 will be described below.

(1) The wire 200 is inserted through the rubber plug for wire 80 so as to attach the rubber plug for wire 80 to the wire 200.

(2) A terminal portion of a coating 210 of the wire 200 is removed, a portion of core wire 220 exposed thereby is inserted into the connection portion 32 of the contact 30, and the connection portion 32 is crimped to the core wire 220. The contact 30 is thus attached to the wire 200.

(3) The shrink tube 60 before heat shrinking is put around the contact 30 from the front end side (the contact portion 31 side) of the contact 30 to be positioned in a range including at least a portion of the connection portion 32 and a terminal portion of the coating 210 of the wire 200 and then the shrink tube 60 is heat-shrunk to cover the connection portion 32 and a terminal portion 200a of the wire 200.

(4) The sleeve 40 is put around the contact 30 from the front end side (the contact portion 31 side) of the contact 30, in a way the cylindrical portion 41 comes first, so as to be attached to the contact 30. The sleeve 40 is fixed to the contact 30 in a manner such that the claw portions 43 on respective front ends of the four tongue pieces 42 interfere with the contact 30 to be pressed, accordingly the four tongue pieces 42 are elastically deformed in a radially opening direction and then elastically restored, and the four claw portions 43 are fitted into the annular groove 34 of the contact 30. At this time, the rubber plug for wire 80 is slid to be sandwiched between the large diameter portion 41a of the cylindrical portion 41 of the sleeve 40 and the wire 200 as necessary. The connection portion 32 of the contact 30 and the terminal portion of the wire 200 that are covered by the shrink tube 60 are accordingly accommodated in the sleeve 40.

(5) The rubber plug for sleeve 70 is put around the sleeve 40 from the front end side of the tongue pieces 42 of the sleeve 40 up to the front of the large diameter portion 41a so as to be attached around the cylindrical portion 41.

(6) The sleeve 40, to which the rubber plug for sleeve 70 is attached as described above and which is integrated with the contact 30, is inserted into the accommodation space 24 from the large diameter portion 22 side of the housing 20, in a way the contact portion 31 of the contact 30 comes first in the insertion direction. The front ends of the four tongue pieces 42 of the sleeve 40 are abutted on the step surface 25, which is formed on the inner wall facing the accommodation space 24, as illustrated in FIG. 4. Accordingly, the forward movement of the contact 30 and the sleeve 40 is blocked and the contact 30 and the sleeve 40 are positioned and accommodated in the accommodation space 24. The contact portion 31 of the contact 30 is positioned in the small diameter portion 21 of the housing 20 and faces the front opening of the accommodation space 24. The rubber plug for sleeve 70 is positioned in the rear of the step surface 26, which is formed on the inner wall facing the accommodation space 24 of the housing 20, and sandwiched between the inner wall facing the accommodation space 24 and the cylindrical portion 41 of the sleeve 40.

(7) Finally, the holder 50 is attached and thereby fastened to the housing 20. The size of the C-shaped opening portion of the holder 50 having the C-shaped cross section is larger than the outer diameter of the wire 200. Therefore, the holder 50 can be attached to the wire 200 from the side of the wire 200, transversely. After the attachment, the holder 50 is moved forward (to the housing 20 side) and the windows 53 formed on the respective three extension pieces 52 are hung to the three respective protrusions 27, which are formed on the outer periphery of the large diameter portion 22 of the housing 20. The holder 50 is thus attached and fixed to the rear end portion of the housing 20.

The attachment of the wire 200 to the connector 100 and the assembly of the connector 100 and the wire harness 300 using it are completed through the above-described process. The sleeve 40 which is coupled with the contact 30 is sandwiched by the step surface 25 of the housing 20 and the lid portion 51 of the holder 50 as illustrated in FIG. 4. Accordingly, the contact 30 is positioned in the accommodation space 24 of the housing 20 and retained in the accommodation space 24 by the holder 50.

One example of the connector according to the present invention has been described above. In the connector 100 described above, the contact 30 does not include a flange for positioning as that of related art and positioning of the contact 30 to the accommodation space 24 of the housing 20 is performed by the sleeve 40 which is attached to and coupled with the contact 30.

In the sleeve 40, the cylindrical portion 41 has the size allowing the contact 30 to be inserted in it and the tongue pieces 42 elastically deform to enable insertion of the contact 30. Therefore, the sleeve 40 can be attached to the contact 30 from the front end side (the contact portion 31 side) of the contact 30. In addition, the shrink tube 60 and the rubber plug for sleeve 70 can also be attached from the front end side of the contact 30, and the holder 50, which is used to retain the sleeve 40 coupled with the contact 30, can be attached to the wire 200 from the side of the wire 200 transversely and then can be attached to the rear end portion of the housing 20 in the last process of the connector assembly.

As a result, components such as the holder 50, the sleeve 40, and the shrink tube 60 do not have to be put and attached to the wire 200 in advance in crimping of the contact 30 to the wire 200, with the only exception of the rubber plug for wire 80. Consequently, the crimping work can be easily performed and workability in the crimping e is improved compared to related art.

In addition, the rubber plug for wire 80, which seals between the cylindrical portion 41 of the sleeve 40 and the wire 200, and the rubber plug for sleeve 70, which seals between the inner wall facing the accommodation space 24 of the housing 20 and the cylindrical portion 41 of the sleeve 40, are provided in this example, providing the configuration that realizes the waterproof structure of the rear end side of the connector 100 from which the wire 200 is derived.

Here, the windows 53 formed on the holder 50 are hung to the protrusions 27 of the housing 20 so as to fix the holder 50 to the housing 20 in this example. However, not limited to this, a holder may be fastened to a housing by screwing, for example.

The foregoing description of the embodiment of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A connector attached to an end of a wire including a core conductor and connectable to a counter connector including a counter contact, the connector comprising:

a contact having an end attached to an end of the core conductor, another end capable of engaging with the counter contact, and an outer surface with an annular groove, and interconnecting the core conductor with the counter contact in a straight line;

a sleeve having side walls arranged cylindrically, and a cylindrical base supporting the side walls, the side walls having tips with claws protruding inward, the sleeve being configured to allow the contact to enter, with said another end of the contact first, the sleeve through the cylindrical base and to allow said another end of the contact to go through the tips having the claws owing to elasticity of the side walls, and thereby the sleeve being attached to the contact with the claws engaging with the annular groove;

a housing having two openings, an inner space extending from one of the two openings to the other of the two openings, and a stopper in the inner space, the housing being configured to allow the contact with the sleeve attached to enter, with said another end of the contact first, the housing through the one of the two openings until the tips of the side walls contact the stopper and to allow said another end of the contact to be located near the other of the two openings, thereby housing in the inner space the contact with the sleeve attached;

a C-shaped holder snapped onto the wire from a side of the wire and interlocked to the housing to hold the sleeve attached to the contact with the sleeve sandwiched by the stopper and the C-shaped holder;

a shrink tube clamping and securing the end of the contact and the end of the wire while the end of the contact is attached to the end of the core conductor of the wire;

a first gasket; and a second gasket, wherein the sleeve has a cylindrical opening end continuously extending from the cylindrical base of the sleeve, the cylindrical opening end being wider than the cylindrical base, in a state in which the C-shaped holder is interlocked to the housing, a) the C-shaped holder is located outside an end portion of the housing surrounding the one of the two openings of the housing, b) the first gasket, the second gasket, the cylindrical base of the sleeve, and the cylindrical opening end of the sleeve are located in the inner space of the housing and located within a length of the C-shaped holder in a direction in which the wire extends, c) the first gasket fills a gap between the cylindrical base of the sleeve and the end portion of the housing, and d) the second gasket fills a gap between the cylindrical opening end of the sleeve and the wire.

* * * * *